United States Patent
Jeon et al.

(10) Patent No.: US 9,591,550 B2
(45) Date of Patent: Mar. 7, 2017

(54) METHOD AND APPARATUS FOR ENHANCING VOICE SERVICE PERFORMANCE IN COMMUNICATION SYSTEM

(71) Applicant: Samsung Electronics Co., Ltd., Gyeonggi-do (KR)

(72) Inventors: Young-Ki Jeon, Gyeonggi-do (KR); Seong-Ryong Kang, Gyeonggi-do (KR); Woo-Jae Kim, Gyeonggi-do (KR); Jong-Hyune Kim, Seoul (KR); Jung-Ah Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 202 days.

(21) Appl. No.: 14/279,219

(22) Filed: May 15, 2014

(65) Prior Publication Data

US 2014/0341131 A1    Nov. 20, 2014

(30) Foreign Application Priority Data

May 15, 2013 (KR) ........................ 10-2013-0055163

(51) Int. Cl.
*H04W 40/02* (2009.01)
*H04L 12/715* (2013.01)
*H04W 76/02* (2009.01)

(52) U.S. Cl.
CPC ............. *H04W 40/02* (2013.01); *H04L 45/64* (2013.01); *H04W 76/022* (2013.01)

(58) Field of Classification Search
None
See application file for complete search history.

(56) References Cited

U.S. PATENT DOCUMENTS 8,122,098 B1* 2/2012 Richardson ......... H04L 61/1511
709/217
2001/0014586 A1* 8/2001 Nakatsugawa ........ H04B 7/155
455/13.1

(Continued)

FOREIGN PATENT DOCUMENTS

JP WO2012090351 A1 * 8/2011 ............. H04L 45/42
JP WO2012070173 A1 * 9/2011 ............. H04L 69/22
WO WO 2012/090351 A1 7/2012

OTHER PUBLICATIONS

PCT International Search Report in connection with PCT/KR2014/004349, Aug. 26, 2014, 3 pgs.

(Continued)

*Primary Examiner* — Hassan Kizou
*Assistant Examiner* — Hashim Bhatti

(57) ABSTRACT

A method for operating a switch in a communication network includes receiving path information of a service flow between a first user equipment (UE) and a second UE from a controller, receiving a packet forwarded through the service flow from a base station, and transmitting the packet to a path determined by the path information. An apparatus for a switch in a communication network includes a controller configured to receive path information of a service flow between a first user equipment (UE) and a second UE from a controller, receive a packet forwarded through the flow from an evolved NodeB and forward the packet to a path determined by the path information. Other embodiments are also disclosed.

20 Claims, 9 Drawing Sheets

(56) References Cited

U.S. PATENT DOCUMENTS

| | | | |
|---|---|---|---|
| 2005/0014509 A1* | 1/2005 | Semper | H04W 28/24 455/452.2 |
| 2007/0286203 A1* | 12/2007 | Lv | H04L 12/5695 370/395.2 |
| 2009/0147784 A1* | 6/2009 | Miyazawa | H04L 12/4633 370/390 |
| 2010/0202458 A1* | 8/2010 | Sato | H04L 69/04 370/392 |
| 2010/0246386 A1* | 9/2010 | Erceg | H04L 45/302 370/225 |
| 2010/0318670 A1* | 12/2010 | Al-Shalash | H04W 76/02 709/229 |
| 2011/0188379 A1 | 8/2011 | Calippe et al. | |
| 2011/0261723 A1 | 10/2011 | Yamato et al. | |
| 2011/0261825 A1* | 10/2011 | Ichino | H04L 45/38 370/400 |
| 2011/0280173 A1* | 11/2011 | Ha | H04W 76/041 370/312 |
| 2011/0280213 A1* | 11/2011 | Calhoun | H04W 76/022 370/331 |
| 2012/0201140 A1* | 8/2012 | Suzuki | H04L 45/22 370/235 |
| 2012/0300615 A1* | 11/2012 | Kempf | H04W 24/02 370/216 |
| 2013/0024500 A1* | 1/2013 | Cao | H04L 67/2842 709/203 |
| 2013/0028091 A1 | 1/2013 | Sun et al. | |
| 2013/0077570 A1* | 3/2013 | Lee | H04W 76/022 370/328 |
| 2013/0272310 A1* | 10/2013 | Suzuki | H04L 45/04 370/392 |
| 2014/0204746 A1* | 7/2014 | Sun | H04W 28/0247 370/235 |
| 2014/0219179 A1* | 8/2014 | Zakrzewski | H04W 4/18 370/328 |
| 2014/0254373 A1* | 9/2014 | Varma | H04W 40/36 370/235 |
| 2014/0254481 A1* | 9/2014 | Lee | H04M 15/82 370/328 |

OTHER PUBLICATIONS

PCT Written Opinion of the International Searching Authority in connection with PCT/KR2014/004349, Aug. 26, 2014, 5 pgs.

\* cited by examiner

METHOD AND APPARATUS FOR ENHANCING VOICE SERVICE PERFORMANCE IN COMMUNICATION SYSTEM

PRIORITY

The present application is related to and claims priority under 35 U.S.C. §119 to a patent application No. 10-2013-0055163 filed in the Korean Intellectual Property Office on May 15, 2013, the contents of which are incorporated herein by reference.

TECHNICAL FIELD

The present disclosure relates to a method and apparatus for enhancing voice service performance in a communication system.

BACKGROUND

A software defined network (SDN) refers to a network architecture in which control and data planes are decoupled. The control plane is centralized into a controller and the data plane is responsible for traffic forwarding. In the SDN, the centralized controller decides where and how traffic is routing. The control plane performs a function of controlling a network, and the data plane performs a function of forwarding data.

The openflow protocol is a protocol that enables SDN technology and its standardization is already in progress. The openflow protocol defines only how to send the traffic, and what benefit is obtained by the openflow protocol by itself is not clear. Until now, the openflow protocol is mainly applied to switches that connect servers in a data center, and how the openflow protocol is applied to a Long Term Evolution (LTE™) network is not yet discussed actively. Of cause, how the openflow protocol is applied to Voice over LTE (VoLTE) is not yet discussed actively.

The VoLTE is a technology of allowing voice calls to be made using packets on an LTE™ network. The VoLTE sets up a bearer for voice forwarding after attachment of an UE, and allows voice packets to be forwarded preferentially by setting the priority of the bearer to a higher value than others.

However, the VoLTE is based on a basic LTE architecture. That is, voice packets are forwarded to an evolved packet core (EPC) of a core network and the EPC forwards the voice packets to a target receiver. Therefore, there is no efficiency in forwarding of voice packets.

Even when a transmitter and a receiver are served by evolved NodeBs (eNBs) adjacent to each other, the above-described process is performed, leading to inefficiency in forwarding of voice packets.

SUMMARY

To address the above-discussed deficiencies, it is a primary object to provide a method and apparatus for enhancing voice service performance in a communication system.

Another object of the present disclosure is to provide a method and apparatus for efficiently forwarding a VoLTE packet in a LTE communication system.

Another object of the present disclosure is to provide a method and apparatus for efficiently forwarding a VoLTE packet when a LTE communication system uses the openflow protocol.

Another object of the present disclosure is to provide a method and apparatus for efficiently forwarding a VoLTE packet when the openflow protocol is used in a LTE radio access network (RAN) area.

Another object of the present disclosure is to provide a method and apparatus for forwarding a VoLTE packet through a shortest path when the openflow protocol is used in a LTE radio access network (RAN) area.

Another object of the present disclosure is to provide a method and apparatus for efficiently forwarding a VoLTE packet to minimize backhaul traffic when the openflow protocol is used in a LTE radio access network (RAN).

According to an aspect of the present disclosure, a method for operating a switch in a communication network includes receiving path information of a service flow between a first user equipment (UE) and a second UE from a controller, receiving a packet forwarded through the service flow from a base station and transmitting the packet to a path determined by the path information.

According to another aspect of the present disclosure, a method for operating a controller that controls a switch in a communication system includes receiving information about a service flow between a first UE and a second UE from a node that controls the service flow, determining a packet forwarding path between the first UE and the second UE; and transmitting information about the determined path to at least one switch.

According to another aspect of the present disclosure, an apparatus for a switch in a communication network includes a controller configured to receive path information of a service flow between a first UE and a second UE from a controller, receive a packet forwarded through the flow from a base station, and forward the packet to a path determined by the path information.

According to another aspect of the present disclosure, an apparatus for a controller for controlling a switch in a communication network includes a communication unit (e.g., transceiver) configured to receive information about a service flow between a first UE and a second UE from a node that controls the service flow, and a controller configured to determine a packet forwarding path between the first UE and the second UE, wherein the communication unit is configure to transmit the information about the determined path to at least one switch.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Exemplary embodiments of the present disclosure will be described herein below with reference to the accompanying drawings.

The present disclosure provides a method and apparatus for enhancing voice service performance in a communication system, which will be described below.

Figure 1:
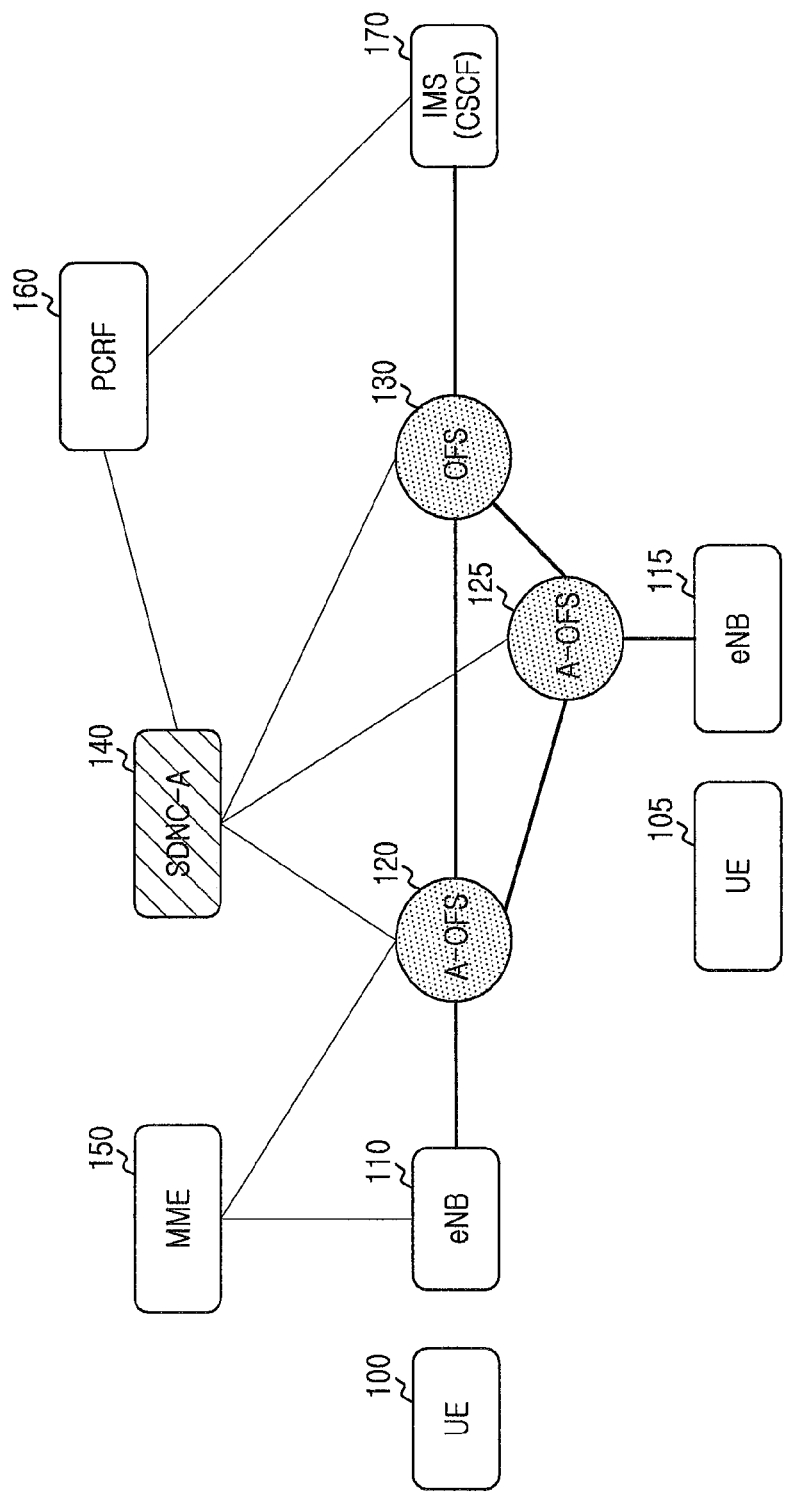
FIG. 1 is a diagram illustrating a Long Term Evolution (LTE) communication system using the openflow protocol according to an embodiment of the present disclosure.

FIG. 1 is a diagram illustrating a Long Term Evolution (LTE) communication system using the openflow protocol according to an embodiment of the present disclosure.

Referring to FIG. 1, the LTE communication system using the openflow protocol includes access-openflow switches (A-OFSs) 120 and 125 connected to evolved nodeBs (eNBs) 110 and 115, the openflow switch (OFS) 130 connected even to other backhaul and core networks, a software defined network controller-access (SDNC-A) 140 for controlling the A-OFSs 120 and 125 and the OFS 130, a mobility management entity (MME) 150, a policy and charging rules function (PCRF) 160, and an IP multimedia subsystem (IMS) (call session control function (CSCF)) 170.

The eNBs 100 and 115 connect to at least one user equipment (UE) 100 or 105 in a wireless manner, process packet calls, and perform a function of transmitting and receiving radio signals, a function of modulating and demodulating packet traffic, and a function of controlling wireless resources. Herein, the eNB 100 and 115 can be referred as a base station.

The MME 150 processes control messages by interworking with the eNBs 110 and 115 using a non-access stratum (NAS) signaling protocol and performs functions, such as mobility management, Tracking Area (TA) list management, and bearer and session management with respect to the UEs 100 and 105.

The PCRF 115 can generate policy rules for adaptive application of quality of service (QoS) and charging rules with respect to service flows, or generate rules commonly applicable to a plurality of service flows. When a VoLTE connection of the UE 100 or 105 is established, the PCRF 160 forwards information about a flow which is forwarded from the IMS 170 to the SDNC-A 140 through a RESTful API. The IMS 170 performs a call processing function with respect to the UEs 100 and 105.

The SDNC-A 140 interworks with the PCRF 160 to acquire information about a VoLTE packet. The SDNC-A 140 determines an optimal forwarding path for each of the A-OFSs 120 and 125 based on information about a flow between the UEs 110 and 105 and forwards information about the determined optimal forwarding path to the A-OFSs 120 and 125, enabling a VoLTE packet of a relevant flow to be forwarded through its shortest distance or shortest path. In this case, the shortest path represents a path with a minimum number of Hops. The optimal path is not limited to the path with the minimum number of Hops. The optimal path is an optimal path satisfying a given condition, such as a condition that latency is short or a condition that a bandwidth required to transmit voice packets is secured, depending on a network situation.

The A-OFSs 120 and 125 and the OFS 130 forward the VoLTE packet to a next node according to the optimal path determined by the SDNC-A 140 when the openflow protocol is used. In addition, the A-OFSs 120 and 125 are responsible for bearer setup, resources allocation, and flow processing according to a PCC-rule with respect to the UEs 100 and 105. The A-OFSs 120 and 125 perform the data plane function of an evolved packet core (EPC) and sets up a path based on control information forwarded from the SDNC-A 140. The openflow agent is performed in the A-OFSs 120 and 125 to perform the above-described functions. When a packet of a service flow that is not set up is received, the A-OFSs 120 and 125 report reception of the packet to the SDNC-A 140 and receive control information from the SDNC-A 140 to set up a paths for relevant UEs.

The OFS 130 is a switch capable of processing a general openflow protocol. The OFS 130 acquires path information for an UE from the SDNC-A 140 and performs routing for the UE based on the path information. In other words, The OFS 130 sets a path for the UE based on the path information.

In the configuration of the network, the A-OFS 120 performs a GPRS tunneling protocol (GTP) terminating function. In order words, the A-OFS 120 can perform encapsulation and decapsulation on GTP packets. As described above, the A-OFS 120 performs a function similar to that of an existing EPC. Therefore, the MME 150 that exists in an existing core network interworks with the A-OFS 120.

The SDNC-A 140 interworks with the PCRF 160 to acquire path information for a flow. The path information can be 5-tuple information and QoS information. The SDNC-A 140 calculates a forwarding path of VoLTE packets between relevant UEs based on the path information and forwards the path information to the A-OFSs 120 and 125 and the OFS 130 based on the openflow protocol. To this end, the SDNC-A 140 can use the PCRF 160 and a RESTful API. The 5-tuple information and the QoS information are described in a standard specification. The 5-tuple information can include IP addresses, port numbers, and protocol information of nodes on a path.

Figure 2:
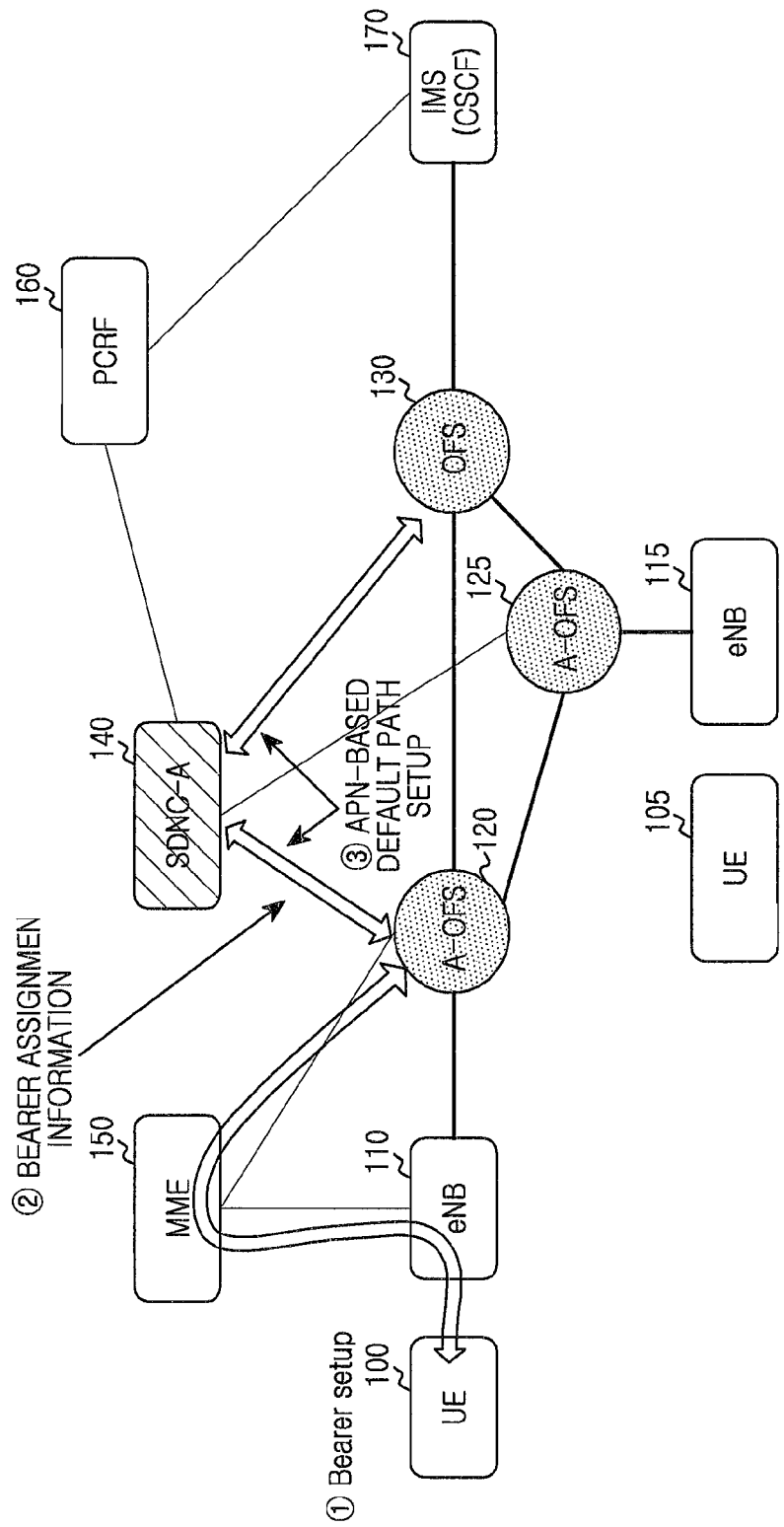
FIG. 2 is a diagram illustrating a process of setting an IP address of an UE in a LTE communication system using the openflow protocol according to an embodiment of the present disclosure.

FIG. 2 is a diagram illustrating a process of setting an IP address of an UE in a LTE communication system using the openflow protocol according to an embodiment of the present disclosure.

Referring to FIG. 2, the UE 100 performs a bearer setup procedure in compliance with the LTE standard when the UE 100 is attached to the eNB 110 (step 1). According to an embodiment of the present disclosure, the A-OFSs 120 and 125 perform the role of an evolved packet core (EPC). Therefore, the UE 100 performs the bearer setup procedure with the A-OFS 120, and is assigned with an IP address through the MME 150.

Thereafter, the A-OFS 120 forwards bearer assignment information (Tunnel End Point Identifier (TEID), International Mobile Subscriber Identity (IMSI), etc.) along with the assigned IP address of the UE 100 to the SDNC-A 140 (step 2). The SDNC-A 140 sets up access point name (APN)-based default paths of openflow switches including the OFS 130 in order to route VoLTE packets based on the information in step 3. The UE 105 performs bearer setup and IP address assignment procedures similarly.

Figure 3:
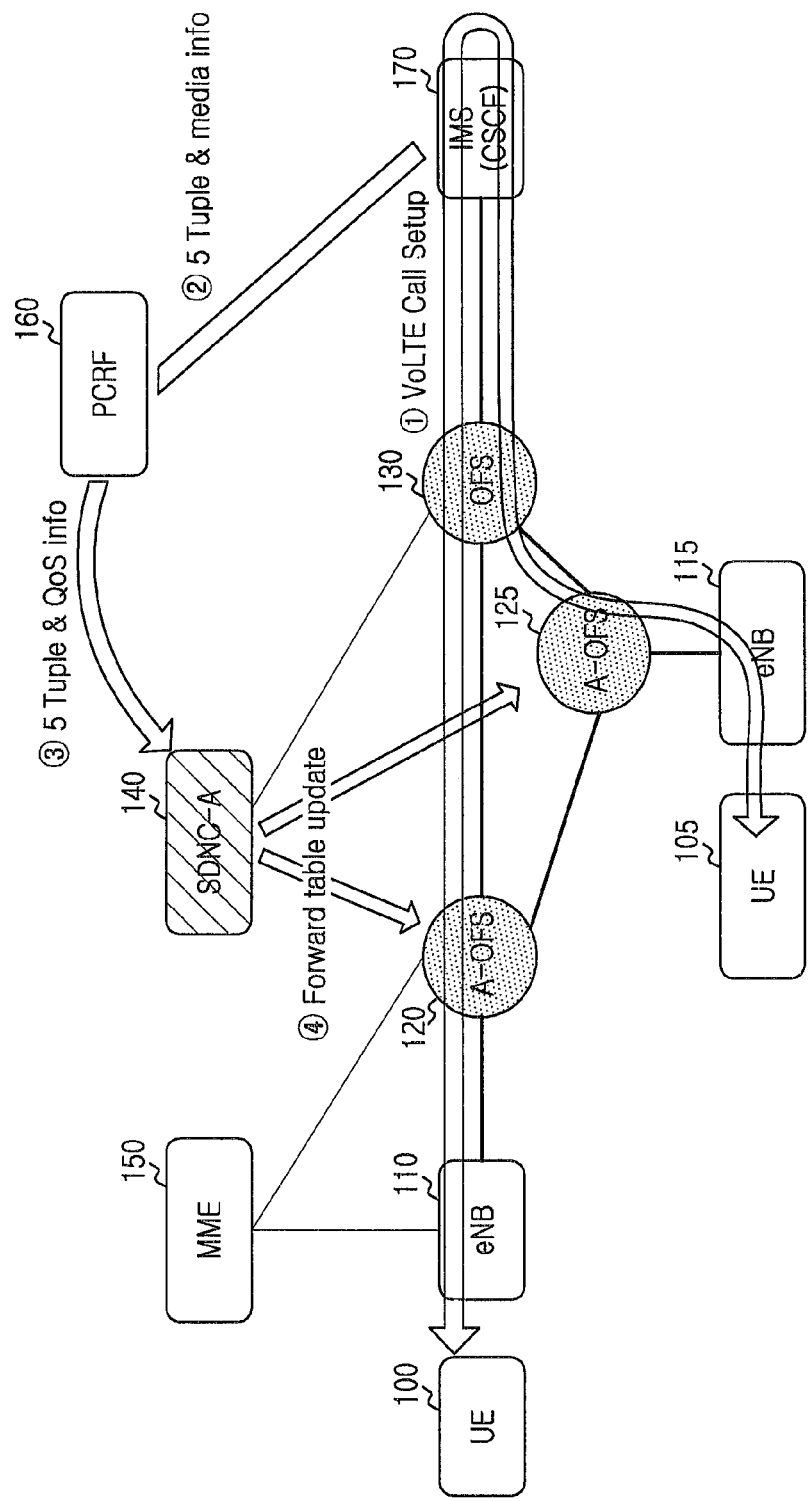
FIG. 3 is a diagram illustrating a process of setting up a VoLTE path in a LTE communication system using the openflow protocol according to an embodiment of the present disclosure.

FIG. 3 is a diagram illustrating a process of setting up a VoLTE path in a LTE communication system using the openflow protocol according to an embodiment of the present disclosure.

Referring to FIG. 3, there is illustrated a process of setting up a VoLTE path between the UE 100 and the UE 105. When it is assumed that the UE 100 is a transmitting terminal and the UE 105 is a receiving terminal, the IMS 170 sets up a path based on the IP address of the UE 100 in response to a VoLTE call setup request in step 1. The IMS 170 forwards 5-tuple information and QoS information which are associated with the path to the PCRF 160 in step 2. The process of setting up a path in the IMS 170 complies with a standard specification.

The PCRF 160 forwards the 5-tuple information and the QoS information which are transferred from the IMS 170 to the SDNC-A 140 using a RESTful API in step 3. The SDNC-A 140 calculates an optimal path with respect to a network architecture identified in advance based on the information and sets up the optimal path for the A-OFSs 120 and 130. The PCRF 160 forwards information about the optimal path to the A-OFSs 120 and 125 in step 4. Upon forwarding of information about the optimal path, information indicating updating of a forwarding table which is used in the OFS can be forwarded. The optimal path can be a shortest path or a shortest distance. In this case, the shortest path represents a path with a minimum number of Hops. The optimal path is not limited to the minimum number of Hops. The optimal path is an optimal path satisfying a given condition, such as a condition that latency is short or a condition that a bandwidth required to transmit voice packets is secured, depending on a network situation. Each of the A-OFSs 120 and 125 is an A-OFS on a path determined such that VoLTE packets are forwarded between the UEs 100 and 105.

Figure 4:
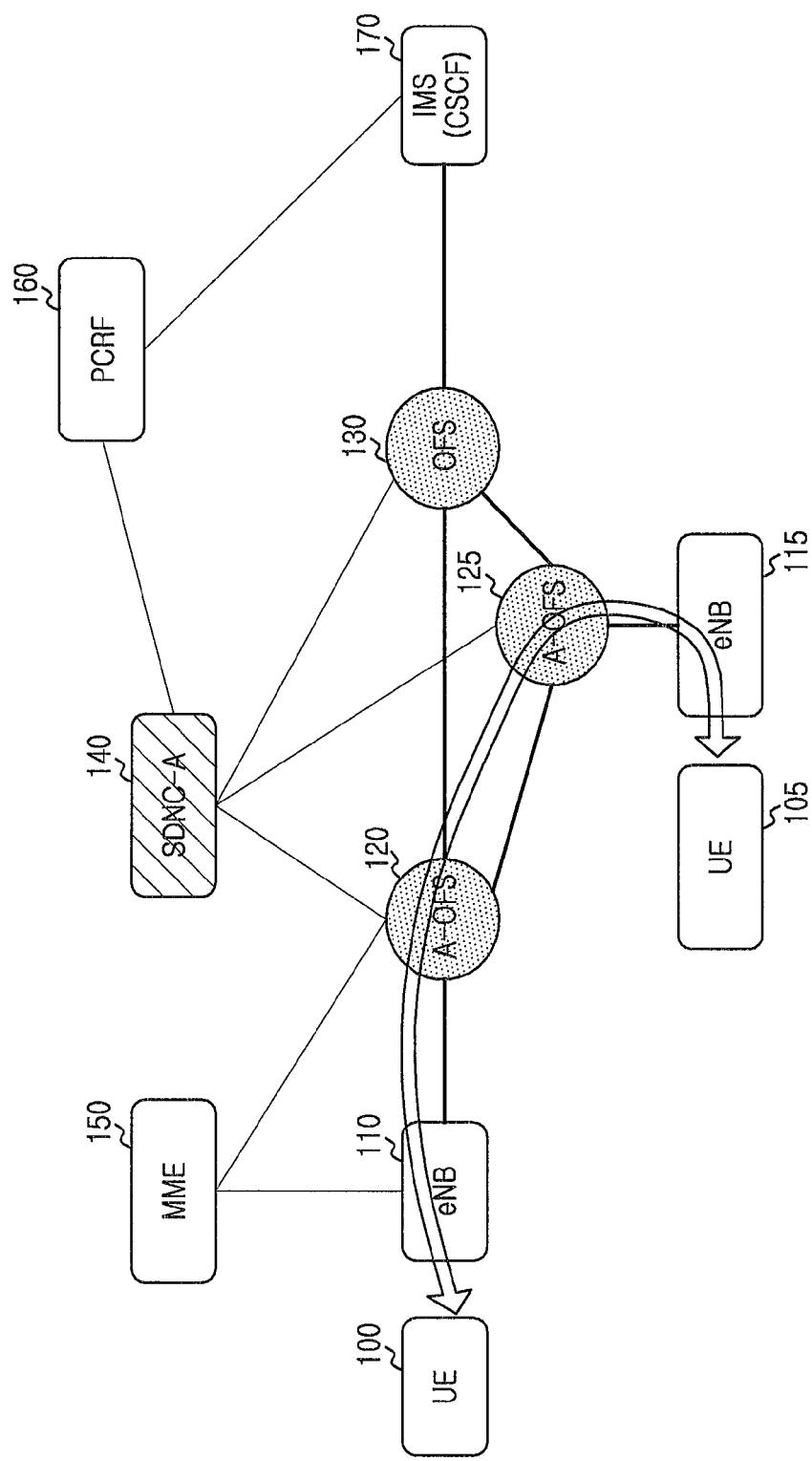
FIG. 4 is a diagram illustrating a path through which two UEs forward VoLTE packets to each other which is determined as an optimal path in a LTE communication system using the openflow protocol according to an embodiment of the present disclosure.

FIG. 4 is a diagram illustrating a path through which two UEs forward VoLTE packets to each other which is determined as an optimal path in a LTE communication system using the openflow protocol according to an embodiment of the present disclosure.

Referring to FIG. 4, the UE 100 and the UE 105 are positioned respectively adjacent to the eNB 110 and the eNB 115. Therefore, when a path between the A-OFS 120 connected to the eNB 110 and the A-OFS 125 connected to the eNB 115 is set up, VoLTE packets are exchanged between the UE 100 and the UE 105 through a shortest distance. Therefore, latency to be taken to forward the VoLTE packets can be reduced, and service quality can be enhanced.

When the packets are transmitted through tunneling, the A-OFS 120 can decapsulate a tunneling packet and again encapsulate the tunneling packet. Specifically, the A-OFS 120 can extract data by performing decapsulation, identify a target UE from the data, and generate a tunneling packet by performing encapsulation on the data. For example, the tunneling packet can be a GTP packet.

Figure 5:
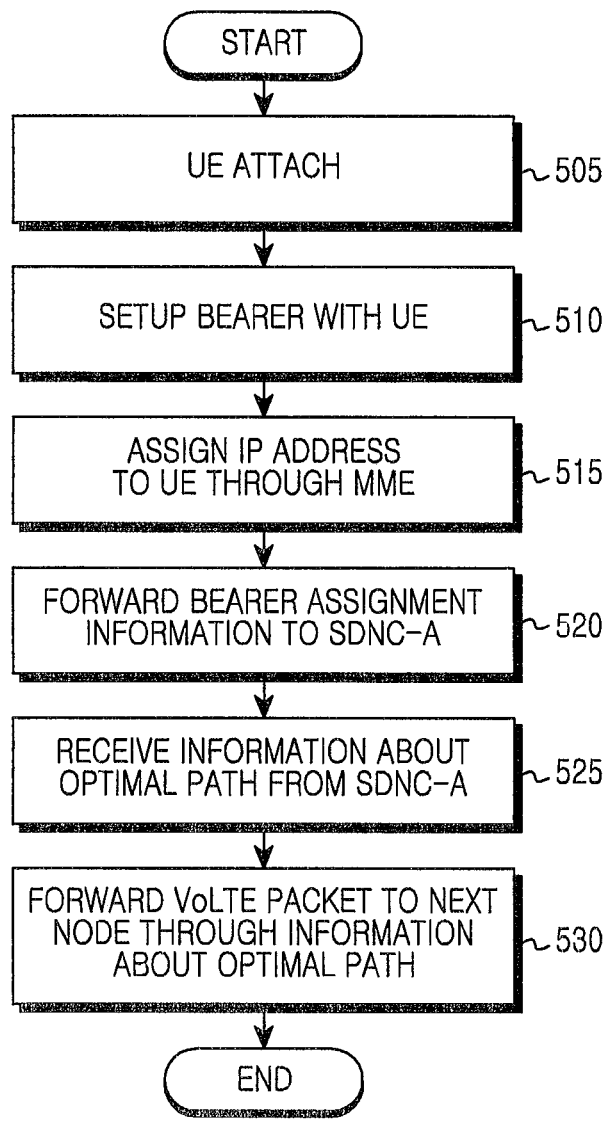
FIG. 5 is a flowchart illustrating operation of an A-OFS in a LTE communication system using the openflow protocol according to an embodiment of the present disclosure.

FIG. 5 is a flowchart illustrating operation of an A-OFS in a LTE communication system using the openflow protocol according to an embodiment of the present disclosure.

Referring to FIG. 5, when an UE is attached in step 505, the A-OFS performs a bearer setup procedure with the UE in step 510. In step 515, the A-OFS assigns an IP address to the UE through a MME.

In step 520, the A-OFS forwards bearer assignment information (for example, TEID or IMSI) to a SDNC-A.

In step 525, the A-OFS receives information about an optimal path for the UE from the SDNC-A. The optimal path is a shortest distance or a shortest path. The shortest path can represent a minimum number of Hops. The optimal path is not limited to the path with the minimum number of Hops. The optimal path is an optimal path satisfying a given condition, such as a condition that latency is short or a condition that a bandwidth required to transmit voice packets is secured, depending on a network situation. The information about the optimal path can be a forwarding table indicating a next A-OFS or a next eNB to which the A-OFS forwards a VoLTE packet directed to a relevant UE.

In step 530, the A-OFS forwards the VoLTE packet to the next node using the information about the optimal path.

Figure 6:
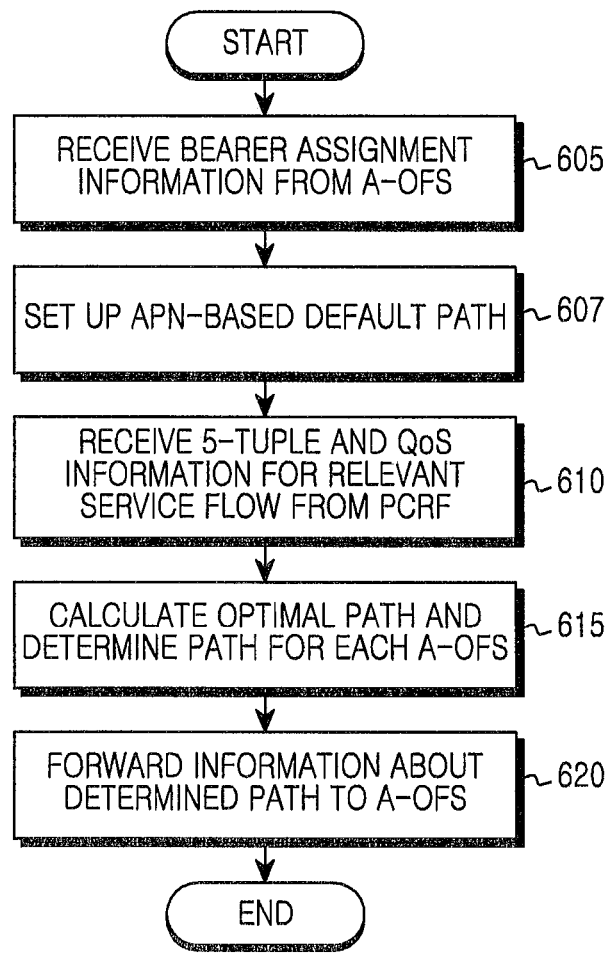
FIG. 6 is a flowchart illustrating operation of a SDNC-A in a LTE communication system using the openflow protocol according to an embodiment of the present disclosure.

FIG. 6 is a flowchart illustrating operation of a SDNC-A in a LTE communication system using the openflow protocol according to an embodiment of the present disclosure.

Referring to FIG. 6, the SDNC-A receives bearer assignment information (TEID, IMSI, etc.) associated with a source UE or a target UE from an A-OFS in step 605, and sets up an APN-based default path for the source UE or the target UE in step 607.

Thereafter, the SDNC-A receives 5-tuple information and QoS information associated with a relevant flow of the source UE or the target UE from a PCRF in step 610.

In step 615, the SDNC-A calculates an optimal path for the flow using the 5-tuple and QoS information and determines a path for each A-OFS.

In step 620, the SDNC-A forwards the information about the determined optimal path to the A-OFS. The information about the optimal path can be a forwarding table indicating a next A-OFS or a next eNB to which the A-OFS forwards a VoLTE packet directed to a relevant UE.

Figure 7:
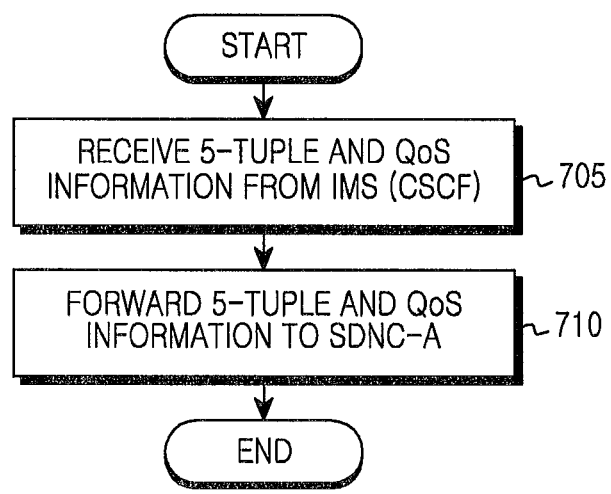
FIG. 7 is a flowchart illustrating operation of a PCRF in a LTE communication system using the openflow protocol according to an embodiment of the present disclosure.

FIG. 7 is a flowchart illustrating operation of a PCRF in a LTE communication system using the openflow protocol according to an embodiment of the present disclosure.

Referring to FIG. 7, the PCRF receives 5-tuple and QoS information associated with a path of a relevant UE from a IMS in step 705 and forwards the 5-tuple and QoS information to a SDNC-A in step 710.

Figure 8:
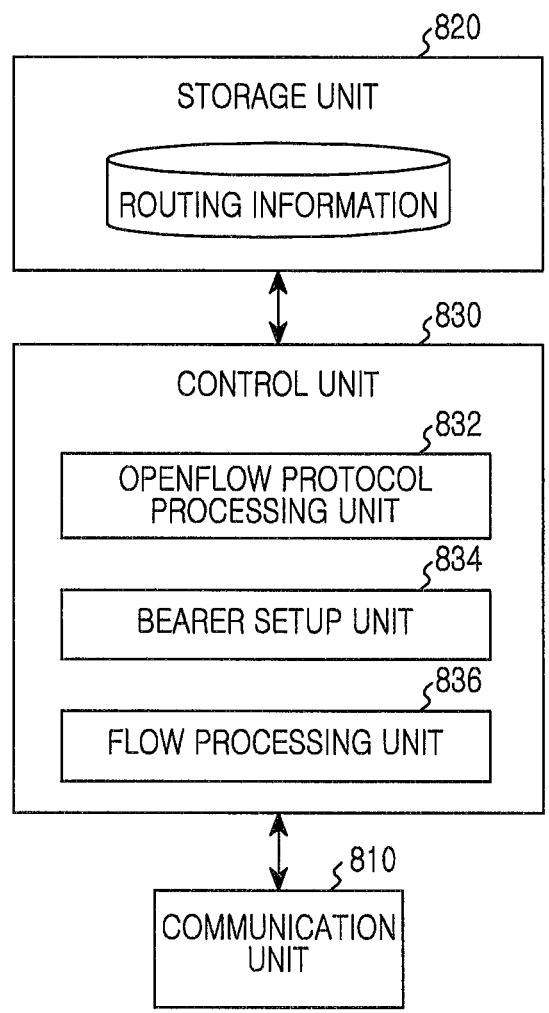
FIG. 8 is a block diagram illustrating a block configuration of an A-OFS according to an embodiment of the present disclosure.

FIG. 8 is a block diagram illustrating a block configuration of an A-OFS according to an embodiment of the present disclosure.

Referring to FIG. 8, the A-OFS includes a communication unit (e.g., transceiver) 810, a storage unit 820, and a control unit 830. The communication unit 810 provides an interface for transmitting and receiving information to and from another entity through a network. The communication unit 810 can be called a "network card". The communication unit 910 can use an Ethernet interface, an optical interface or an ATM interface, and is not limited to interface types. The communication unit 810 transmits and receives signals as descried above. Therefore, the communication unit 810 can be called a transmission unit, a reception unit or, a transceiver unit.

The storage unit 820 stores default programs, setting information, and the like which are required for operation of the A-OFS. The storage unit 820 stores path information which is information about an optimal path transferred from the SDNC-A. The path information can be a forwarding table indicating a next A-OFS or a next eNB to which the A-OFS forwards a VoLTE packet directed to a relevant UE. The storage unit 820 updates data according to control of the control unit 830 and provides stored data.

The control unit 830 controls overall operation of the A-OFS. According to an embodiment of the present disclosure, the control unit 830 includes the openflow protocol processing unit 832 for performing control such that the A-OFS operates as the openflow protocol agent, a bearer setup unit 834 for performing a bearer setup procedure for an UE, and a flow processing unit 836 for processing flows of UEs. In order for routing and VoLTE packet forwarding according to an embodiment of the present disclosure, the flow processing unit 836 receives information about an optimal path from the SDNC-A through the communication unit 810 and forwards the VoLTE packet of a relevant flow to a next node according to the information about an optimal path through the communication unit 810 as illustrated in FIG. 5.

Figure 9:
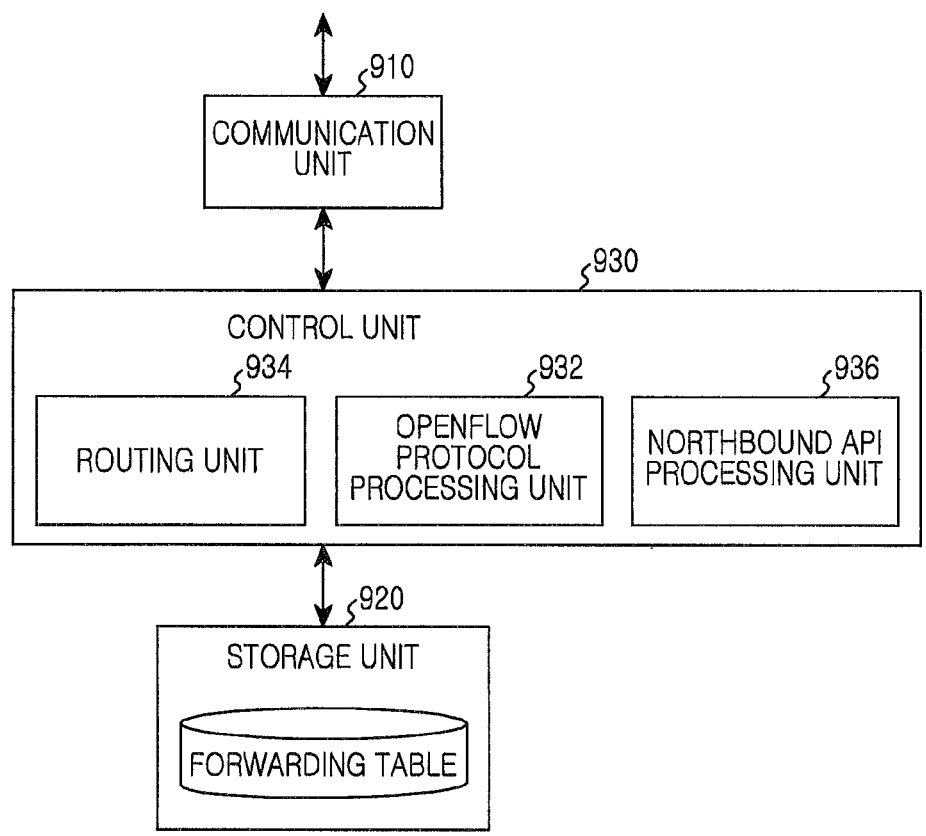
FIG. 9 is a block diagram illustrating a block configuration of a SDNC-A according to an embodiment of the present disclosure.

FIG. 9 is a block diagram illustrating a block configuration of a SDNC-A according to an embodiment of the present disclosure.

Referring to FIG. 9, the SDNC-A includes a communication unit 910, a storage unit 920, and a control unit 930. The communication unit 910 provides an interface for transmitting and receiving information to and from another entity through a network. The communication unit 810 can be called a "network card". The communication unit 910 can use an Ethernet interface, an optical interface or an ATM interface, and is not limited to interface types. The communication unit 910 transmits and receives signals as descried above. Therefore, the communication unit 910 can be called a transmission unit, a reception unit or, a transceiver unit.

The storage unit 920 stores default programs, setting information, and the like which are required for operation of the SDNC-A. The storage unit 920 can store path information reported by the PCRF and a forwarding table indicating an optimal path for a relevant flow. The storage unit 920 updates data according to control of the control unit 930 and provides stored data.

The control unit 930 controls overall operation of the SDNC-A. According to an embodiment of the present disclosure, the control unit 930 includes the openflow protocol processing unit 932 for performing control such that the SDNC-A operates as the openflow protocol controller and a routing unit 934 for setting up an optimal path for a flow. The control unit 930 includes a northbound API processing unit 936 for receiving information required for routing. The control unit 930 interworks with a video controller through the northbound API processing unit to acquire information necessary for routing. In order for routing according to an embodiment of the present disclosure, the routing unit 934 receives the path information from the PCRF, determines an optimal path, and forwards information the optimal path to the A-OFS through the communication unit 910 as illustrated in FIG. 6.

In the embodiments of the present disclosure, the components included therein are expressed in the singular form or in the plural form depending on the embodiments. The expressions of the singular form or the plural form have been properly selected depending on a situation for convenience of description. The present disclosure is not limited to a singular component or plural components. Any components expressed in the singular form herein are meant to also include the plural form and vice versa.

The embodiments of the present disclosure efficiently forwards VoLTE packets using the openflow protocol in a LTE RAN area, minimizing backhaul traffic.

In addition, the embodiments of the present disclosure forwards VoLTE packets through a shortest distance or a shortest path using the openflow protocol in the LTE RAN area, enhancing voice service performance.

Embodiments of the present invention according to the claims and description in the specification can be realized in the form of hardware, software or a combination of hardware and software.

Such software may be stored in a computer readable storage medium. The computer readable storage medium stores one or more programs (software modules), the one or more programs comprising instructions, which when executed by one or more processors in an electronic device, cause the electronic device to perform methods of the present invention.

Such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disc (CD), Digital Video Disc (DVD), magnetic disk or magnetic tape or the like. It will be appreciated that the storage devices and storage media are embodiments of machine-readable storage that are suitable for storing a program or programs comprising instructions that, when executed, implement embodiments of the present invention. Embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method for operating a switch in a communication network, comprising:
   receiving information on a path between a first user equipment (UE) accessed to a base station (BS) and a second UE accessed to another BS, from a controller, wherein the first UE is connected to a first access-openflow switch (A-OFS) and a second UE is connected to a second A-OFS; and
   transmitting, to the second UE, a voice packet received from the BS according to the information on the path,
   wherein the path is determined to pass through a tunnel that is formed between first A-OFS and the second A-OFS by using a tunneling protocol based on information of the voice packet and quality of service (QoS) information, and
   wherein the information of the voice packet and the QoS information are transmitted to the controller from an interne protocol multimedia subsystem (IMS) server.

2. The method of claim 1, wherein the voice packet is a tunnel packet, and the method further is comprising:
   performing decapsulation on the tunnel packet;
   identifying a flow which the packet belongs to; and
   generating a tunnel packet by performing encapsulation.

3. The method of claim 1, wherein transmitting the voice packet comprises: transmitting the packet to another BS or another switch connected to another BS.

4. The method of claim 1, further comprising:
   performing a bearer setup procedure upon access of the first UE; and
   transmitting bearer setup information of the first UE to the controller.

5. The method of claim 1, further comprising:
   reporting a reception of an non-routed packet to the controller when the non-routed packet is received.

6. A method for operating a controller configured to control at least one switch in a communication system, comprising:
   receiving information of a voice packet and quality of service (QoS) information between a first user equipment (UE) accessed to a base station (BS) and a second UE accessed to another BS, from an interne protocol multimedia subsystem (IMS) server, wherein the first UE is connected to a first access-openflow switch (A-OFS) and a second UE is connected to a second A-OFS;
   determining a path between the first UE and the second UE for transmission of the voice packet, the path passing through a tunnel that is fanned between first A-OFS and the second A-OFS by using a tunneling protocol; and
   transmitting information on the path to at least one switch.

7. The method of claim 6, wherein the information of the voice packet and the QoS information are transmitted through a Policy and Charging Rules Function (PCRF).

8. The method of claim 6, wherein the information of the voice packet comprises 5-tuple information associated with the path.

9. The method of claim 6, wherein the path comprises at least one of a path with a minimum number of hops, a path having a minimum latency, and a path with a bandwidth for packet forwarding.

10. The method of claim 6, further comprising:
    receiving bearer setup information of the first UE from a switch connected to a base station to which the first UE is accessed upon an initial access of the first UE.

11. An apparatus of a switch in a communication network, comprising:
    a processor; and
    a transceiver operatively coupled to the processor, and configured to:
      receive information on a path between a first user equipment (UE) accessed to a base station (BS) and a second UE accessed to another BS, from a controller;
      transmit, to the second UE, a voice packet received from the BS according to the information on the path, wherein the first UE is connected to a first access-openflow switch (A-OFS) and a second UE is connected to a second A-OFS,
    wherein the path is determined to pass through a tunnel that is formed between first A-OFS and the second A-OFS by using a tunneling protocol based on information of the voice packet and quality of service (QoS) information, and
    wherein the information of the voice packet and the QoS information are transmitted to the controller from an interne protocol multimedia subsystem (IMS) server.

12. The apparatus of claim 11, wherein the voice packet is a tunnel packet, and
    the processor is configured to:
      perform decapsulation on the tunnel packet,
      identify a flow which the packet belongs to, and
      generate a tunnel packet by performing encapsulation.

13. The apparatus of claim 11, wherein the transceiver is configured to:
    transmit the voice packet to another BS or another switch connected to another BS.

14. The apparatus of claim 11, wherein the processor is configured to:
    perform a bearer setup procedure upon access of the first UE; and
    control the transceiver to transmit bearer setup information of the first UE to the controller.

15. The apparatus of claim 11, wherein the transceiver is configured to:
    report reception of an non-routed packet to the controller if the non-routed packet is received.

16. An apparatus of a switch in a communication network, comprising:
    a processor; and
    a transceiver operatively coupled to the processor, and configured to receive information of a voice packet and quality of service (QoS) information between a first user equipment (UE) accessed to a base station (BS) and a second UE accessed to another BS, from an internet protocol multimedia subsystem (IMS) server, wherein the first UE is connected to a first access-openflow switch (A-OFS) and a second UE is connected to a second A-OFS;
    wherein the processor is configured to determine a path between the first UE and the second UE for transmission of the voice packet, the path passing through a tunnel that is formed between first A-OFS and the second A-OFS by using a tunneling protocol
    wherein the transceiver is configured to transmit information on the path to at least one switch.

17. The apparatus of claim 16, wherein the information of the voice packet and the QoS information are transmitted through a policy and charging rules function (PCRF).

18. The apparatus of claim 16, wherein information of the voice packet comprises of 5-tuple information associated with the path.

19. The apparatus of claim 16, wherein the path comprises at least one of path with a minimum number of hops, a path having a minimum latency, and a path with a bandwidth for packet forwarding.

20. The apparatus of claim 16, wherein the transceiver is configured to receive bearer setup information of the first UE from a switch connected to a base station to which the first UE is accessed upon an initial access of the first UE.

* * * * *